United States Patent [19]

Newton

[11] Patent Number: 4,766,723
[45] Date of Patent: Aug. 30, 1987

[54] TURBOFAN GAS TURBINE ENGINE AND MOUNTINGS THEREFORE

[75] Inventor: Arnold C. Newton, Derby, England

[73] Assignee: Rolls-Royce plc, London, England

[21] Appl. No.: 35,865

[22] Filed: Apr. 8, 1987

[30] Foreign Application Priority Data

Apr. 9, 1986 [GB] United Kingdom ................ 8608659

[51] Int. Cl.⁴ ............................................. F02K 3/062
[52] U.S. Cl. ................................... 60/39.31; 60/226.1
[58] Field of Search ............... 60/39.162, 39.31, 226.1, 60/226.2, 226.3; 244/54

[56] References Cited

U.S. PATENT DOCUMENTS

| | | | |
|---|---|---|---|
| 3,070,285 | 12/1962 | Oldfield | 60/226.1 |
| 3,222,017 | 12/1965 | Bobo | 60/39.31 |
| 3,750,983 | 8/1973 | Morris | 60/226.1 |
| 3,837,602 | 9/1974 | Mullins | 244/54 |
| 4,037,809 | 7/1977 | Legrand | 60/226.1 |
| 4,266,741 | 5/1981 | Murphy | 60/226.1 |
| 4,458,863 | 7/1984 | Smith | 244/54 |
| 4,555,078 | 11/1926 | Grognard | 60/226.1 |
| 4,603,821 | 8/1986 | White | 60/39.31 |
| 4,658,579 | 4/1987 | Bower et al. | 60/226.1 |
| 4,683,717 | 8/1987 | Naud | 60/226.1 |

*Primary Examiner*—Louis J. Casaregola
*Attorney, Agent, or Firm*—Cushman, Darby & Cushman

[57] ABSTRACT

The present invention relates to turbofan.gas turbine engines in which the fan assembly is positioned downstream of the core engine of the turbofan gas turbine engine i.e. an aft fan turbofan. Conventional turbofan engines have the fan assembly positioned upstream of the core engine, and the core engine is mounted onto an aircraft pylon. The fan casing is then carried by the core engine. This arrangement in an aft fan would result in losses and intake distortions under side winds and aircraft yaw. The aft fan turbofan has a core engine and a fan assembly which is positioned downstream of the core engine. An upstream and downstream support means, which comprise struts, extend from a fan casing to the core engine and the fan assembly to support the core engine and fan assembly. Upstream mounting means on the fan casing and a downstream mounting means carry the turbofan engine from an aircraft pylon.

15 Claims, 2 Drawing Sheets

TURBOFAN GAS TURBINE ENGINE AND MOUNTINGS THEREFORE

The present invention relates to turbofan gas turbine engines and in particular to turbofan gas turbine engines in which the fan assembly is positioned downstream of the core engine of the turbofan gas turbine engine, and means of mounting the turbofan as turbine engine from an aircraft.

A conventional high bypass ration turbofan gas turbine in which the fan assembly is positioned upstream of the core engine of the turbofan gas turbine engine is mounted onto an aircraft pylon by upstream and downstream mounting means on the core engine. The upstream and downstream mounting means are positioned adjacent to the fan assembly and the turbines of the core engine respectively. Furthermore the fan casing of the turbofan gas turbine engine is supported from the core engine by support means.

Use of this arrangement on a high bypass ratio turbofan gas turbine engine in which the fan assembly is positioned downstream of the core engine would require the aircraft pylon to be positioned upstream of the fan assembly to enable the core engine which extends in an upstream direction from the fan assembly to be mounted onto the pylon. To give minimum aerodynamic losses the pylon must be suitably faired, and this results in a very long axial arrangement. This may be acceptable if the flow of air to the fan assembly is axial with the fairing, but very large losses and intake distortions occur under side wind or aircraft yaw conditions.

The present invention seeks to provide a turbofan gas turbine engine in which the fan assembly is positioned downstream of the core engine with mounting means which overcomes the above problems.

Accordingly the present invention provides a turbofan gas turbine engine comprising a core engine which has compressor means, combustor means and turbine means, a fan assembly which has at least one fan positioned downstream of the core engine, the at least one fan operating within a fan duct defined in part by a fan casing, upstream support means extending from the fan casing to the core engine to support the core engine from the fan casing, downstream support means extending from the fan casing to the fan assembly to support the fan assembly from the fan casing, upstream mounting means on the fan casing adapted to carry the turbofan gas turbine engine from an aircraft structure, and downstream mounting means positioned downstream of the upstream mounting means and adapted to assist in carrying the turbofan gas turbine engine from the aircraft structure.

The fan assembly may be positioned axially between the upstream and downstream support means.

An axially extending support means may extend in an upstream direction from the downstream support means, the fan assembly being rotatably mounted on the axially extending support means.

The fan assembly may comprise a power turbine means positioned downstream of the turbine means of the core engine and arranged to receive exhaust gases therefrom, upstream and downstream fans arranged to be driven by the power turbine means.

The power turbine means may comprise contra-rotating turbines which are arranged to drive the upstream and downstream fans in opposite directions.

The axially extending support means may be secured to the core engine at its upstream end.

The upstream support means may comprise a plurality of struts, and the downstream support means may comprise a plurality of struts.

The axially extending support means may be a tubular member.

The core engine may be secured to the upstream support means by means which allow relative axial movement but which maintain radial location.

The upstream support means may be secured to the fan casing by a first hoop structure.

The downstream support means may be secured to the fan casing by a deep section support ring.

The upstream mounting means may comprise the deep section support ring.

The aircraft structure may be the aircraft pylon.

The present invention will be more fully described by way of reference to the accompanying drawings, in which.

Figure 1:
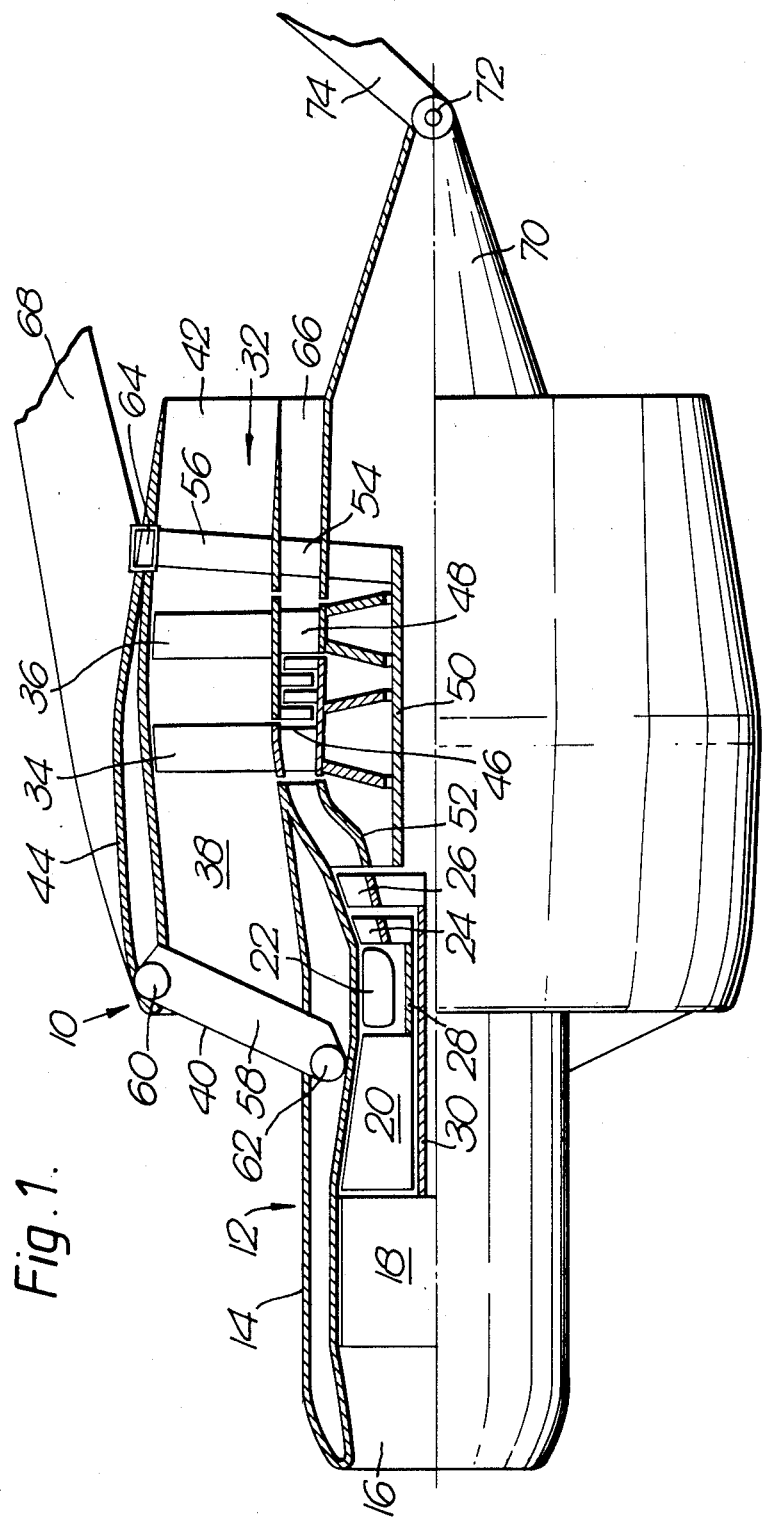
FIG. 1 is a part cut away view of a turbofan gas turbine engine having mountings according to the present invention.
Figure 2:
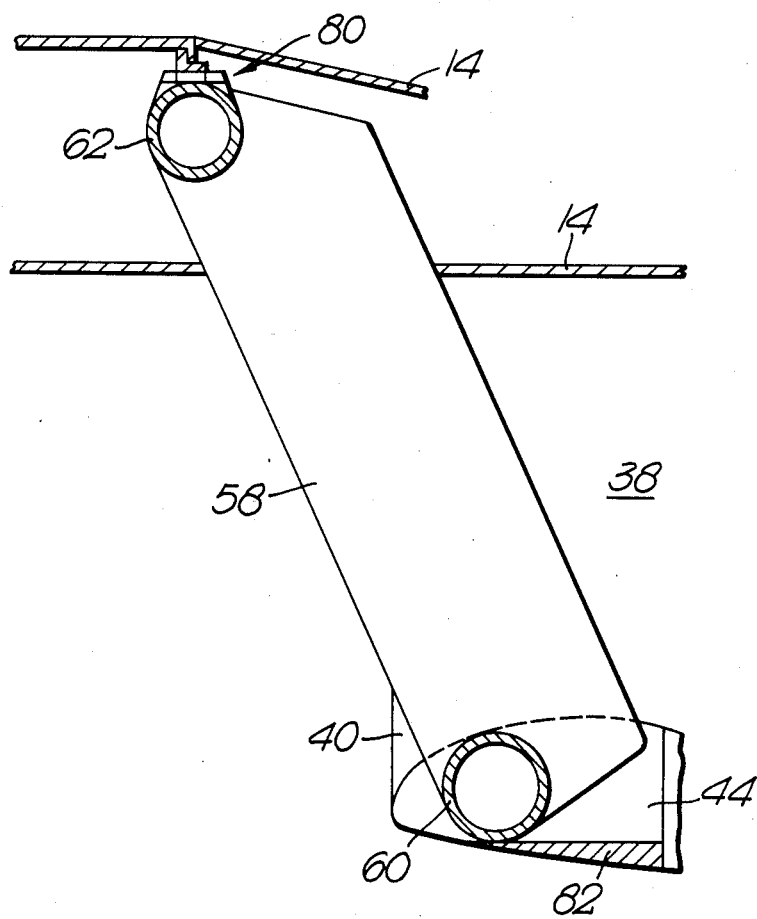
FIG. 2 shows an enlarged sectional view through the upstream support means.

A high bypass ratio turbofan gas turbine engine 10 is shown in FIG. 1, and comprises a core engine 12 which has an inlet 16 through which air flows to a low pressure compressor 18 and a high pressure compressor 20 in flow series. The low pressure and high pressure compressors supply compressed air to combustor means 22, which may be an annular combustor or canannular combustor. Fuel is burnt in the combustor means to produce hot gases which flow through a high pressure turbine 24 and a low pressure turbine 26. The low pressure turbine drives the low pressure compressor via a shaft 30, and the high pressure turbine drives the high pressure compressor via a shaft 28.

A fan assembly 32 is positioned downstream of the core engine 12, and the fan assembly comprises an upstream fan 34 and a downstream fan 36 which are arranged within a fan duct 38. The fan duct has an inlet 40 at its upstream end and a nozzle 42 at its downstream end, and the fan duct is defined by a fan casing 44. The upstream and downstream fans are driven by a power turbine which comprises contra-rotating turbines 46 and 48. The turbine 46 comprises a plurality of stages of blades which extend radially outwardly from a carrying rotor, and turbine 48 comprises a plurality of stages of blades which extend radially inwardly from a carrying rotor. The turbines 46 and 48 are rotatably mounted on a tubular support member 50.

The exhaust gases from the power turbine flow in a downstream direction through the nozzle 66, and the air flowing through the fan duct 38 is compressed and propelled through the fan nozzle 42 to provide thrust.

The tubular support member 50 extends axially in an upstream direction from a downstream support means 54, 56 which comprises a plurality of circumferentially spaced struts or spokes which in part form a vane structure. The downstream support means extend from the fan casing 44 to the tubular member 50 to support the fan assembly from the fan casing, and the downstream support means are positioned downstream of the fan assembly. The radially outer ends of the struts or spokes are secured to a deep section support ring 64 integral with the fan casing.

An upstream support means 58 extends from the fan casing 44, from a position upstream of the fan assembly and adjacent the inlet 40 of the fan duct, to the core engine 12 to support the core engine from the fan casing. The upstream support means comprises a plurality of circumferentially spaced struts or spokes, and the radially outer ends of the struts or spokes are secured to the fan casing by a first hoop structure 60, and the radially inner ends of the struts or spokes are secured to a second hoop structure 62. The second hoop structure is secured to the core engine casing 14 by a cross key device 80 which maintains radial location but which allows axial movement to accept expansion or tolerances.

The upstream end of the tubular support member 50 is secured to the core engine casing 14 by a plurality of vanes 52, which direct exhaust gases from the turbines of the core engine into the power turbine. This arrangement provides further support to the core engine 12 and the fan assembly 32.

The upstream support means controls the forward stability of the core engine and hence gives accurate fan tip clearance control. A flexible cylindrical section 82 in the fan casing enables local deflections caused by thermal expansion to be accommodated, but the main loads are reacted by shear in the flexible cylindrical section.

The fan casing is of monocoque construction and the flexible cylindrical section 82 and the deep section ring 64 are integral in the fan casing construction. The first hoop 60 abuts the flexible cylindrical section 82 and enables engine suspension loads to be reacted by shear into the skins of the monocoque fan casing, this results in a fan casing having reduced weight.

The use of the upstream and downstream support means together with the fan casing, and the axially extending tubular member between the downstream support means and the core engine casing provides a very stiff structure to carry the fan assembly to control the fan tip clearance and to carry the core engine.

The turbofan gas turbine engine 10 is mounted onto an aircraft structure, i.e. pylon 68, by an upstream mounting means 64 on the fan casing 44, and a downstream mounting means 72 which are adapted to carry the turbofan gas turbine engine from the pylon.

The mounting means 72, 74 may be provided downstream of the upstream mounting means 64 and is secured to a cone structure 70 which extends in a downstream direction from the downstream support means 54 and 56. The downstream mounting means is a drag link which assists in carrying the turbofan from the aircraft structure.

The deep section ring 64 acts as the mounting means for the turbofan gas turbine engine, and secures the downstream support means to the fan casing.

It may be possible to provide the power turbine so that one only of the contra-rotating turbines is rotatably mounted on the axially extending tubular support member, the other of the contra-rotating turbines is rotatably mounted on the first.

I claim:

1. A turbofan gas turbine engine comprising:
a core engine which includes compressor means, combustor means, turbine means, and a core casing,
a fan assembly positioned downstream of the core engine and including at least one fan, the at least one fan operating within a fan duct defined in part by a fan casing, the fan casing having an integral deep section support ring,
upstream support means extending from the fan casing to the core engine casing to support the core engine from the fan casing,
downstream support means extending from the fan casing to the fan assembly to support the fan assembly from the fan casing, the downstream support means being secured to the deep section support ring,
an axially extending support means extending in an upstream direction from the downstream support means and being secured to the core engine casing at its upstream end,
the fan assembly being positioned axially between the upstream support means and the downstream support means, and the fan assembly being rotatably mounted on the axially extended support means,
upstream mounted means on the fan casing for carrying the turbo fan gas turbine engine from an aircraft structure, said upstream mounting means including said deep section support ring, and
downstream mounting means arranged to assist in carrying the turbofan gas turbine engine from the aircraft structure.

2. A turbofan gas turbine engine as claimed in claim 1 in which the fan assembly comprises a power turbine means positioned downstream of the turbine means of the core engine and arranged to receive exhaust gases therefrom.

3. A turbofan gas turbine engine as claimed in claim 2 in which the power turbine means comprises contrarotating turbines which are arranged to drive an upstream fan and a downstream fan in opposite directions.

4. A turbofan gas turbine engine as claimed in claim 1 in which the axially extending support means is a tubular member.

5. A turbofan gas turbine engine as claimed in claim 1 in which the upstream support means comprises a plurality of struts.

6. A turbofan gas turbine engine as claimed in claim 1 in which the downstream support means comprises a plurality of struts.

7. A turbofan gas turbine engine as claimed in claim 1 in which the core casing is secured to the upstream support means by securing means which allow relative axial movement but which maintain radial location.

8. A turbofan gas turbine engine as claimed in claim 1 in which the upstream support means are secured to the fan casing by a first hoop structure.

9. A turbofan gas turbine engine as claimed in claim 1 in which the aircraft structure is a pylon.

10. A turbofan gas turbine engine as claimed in claim 7 in which the core engine is secured to the upstream support means by a cross-key device.

11. A turbofan gas turbine engine as claimed in any one of claims 1 to 8 and 11-12 in which a structure extends in a downstream direction from the downstream support means, the downstream mounting means being secured to the structure.

12. A turbofan gas turbine engine as claimed in claim 11 in which the structure is substantially conical.

13. A turbofan gas turbine engine as claimed in claim 8 in which the fan casing comprises a flexible cylindrical section, the first hoop structure abutting the flexible cylindrical section to transmit engine loads into the fan casing.

14. A turbofan gas turbine engine as claimed in claim 8 in which the upstream support means are secured to the core engine casing by a second hoop structure.

15. A turbofan gas turbine engine as claimed in claim 13 in which the upstream support means are secured to the core engine casing by a second hoop structure.

* * * * *

UNITED STATES PATENT AND TRADEMARK OFFICE
CERTIFICATE OF CORRECTION

PATENT NO.   : 4,766,723
DATED        : August 30, 1988
INVENTOR(S)  : Arnold Charles NEWTON It is certified that error appears in the above-identified patent and that said Letters Patent is hereby corrected as shown below:

Please change the "DATE OF PATENT" on the face of the grant to read --August 30, 1988--.

Signed and Sealed this

Twenty-eighth Day of February, 1989

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,766,723

DATED : August 30, 1988

INVENTOR(S) : Newton, Arnold C.

It is certified that error appears in the above-identified patent and that said Letters Patent is hereby corrected as shown below:

Column 1, line 9, change "as" to --gas--.

Claim 1, col. 4, line 15, change "extended" to --extending--.

Claim 1, col. 4, line 16, change "mounted" to --mounting--.

Signed and Sealed this

Sixteenth Day of May, 1989

Attest:

DONALD J. QUIGG

Attesting Officer

Commissioner of Patents and Trademarks